Sept. 9, 1958 W. W. PHARIS 2,851,533

RINGING CURRENT GENERATOR SWITCHING CIRCUIT

Filed June 29, 1954 9 Sheets-Sheet 1

INVENTOR.
WILLIAM W. PHARIS
BY Johnson Whitead
ATTORNEY

Sept. 9, 1958 W. W. PHARIS 2,851,533

RINGING CURRENT GENERATOR SWITCHING CIRCUIT

Filed June 29, 1954

9 Sheets-Sheet 3

Sept. 9, 1958 W. W. PHARIS 2,851,533

RINGING CURRENT GENERATOR SWITCHING CIRCUIT

Filed June 29, 1954 9 Sheets-Sheet 4

Sept. 9, 1958 W. W. PHARIS 2,851,533

RINGING CURRENT GENERATOR SWITCHING CIRCUIT

Filed June 29, 1954 9 Sheets-Sheet 5

Sept. 9, 1958 W. W. PHARIS 2,851,533

RINGING CURRENT GENERATOR SWITCHING CIRCUIT

Filed June 29, 1954 9 Sheets-Sheet 6

Sept. 9, 1958 W. W. PHARIS 2,851,533

RINGING CURRENT GENERATOR SWITCHING CIRCUIT

Filed June 29, 1954

9 Sheets-Sheet 8

2,851,533
Patented Sept. 9, 1958

2,851,533

RINGING CURRENT GENERATOR SWITCHING CIRCUIT

William W. Pharis, Rochester, N. Y., assignor, by mesne assignments, to General Dynamics Corporation, a corporation of Delaware Application June 29, 1954, Serial No. 440,006

17 Claims. (Cl. 179—17)

This invention relates to a ringing current generator switching circuit particularly adapted for use with a ten party telephone connector switch.

Telephone systems generally provide for service over party lines wherein means must be provided for selectively signaling a called party line subscriber. This includes the use of a selecting device which may be operated to select between various codes used to signal individual party line subscribers. Heretofore, it has been necessary to provide two distinct types of ten party selective connectors. One type is for use in connection with an interrupter that is adapted to produce either ten or twenty ringing codes, and the other type is for use in connection with an interrupter that is adapted to produce only ten ringing codes. Conventionally a twenty code interrupter is the same as a ten code interrupter except that the interrupter supplies a twenty party pulse code which is used as a prefix to the usual ten codes of ringing current. A twenty code selective connector uses the ten codes without the prefix pulse to provide codes 1 to 10 and uses the ten codes with the prefix pulse to provide codes 11 to 20. Heretofore, the ten code connectors in such a system have had to be of a special type which may eliminate the prefix pulse. If means are provided to prevent the transmission of the prefix pulse to the connector, all ten party connectors may be of the same design.

One object of this invention is to provide for the use of a single type of ten party selective connectors for either ten or twenty code interrupters.

Another object of this invention is to provide a new and improved ringing current switching circuit.

Still another object of this invention is to provide a ten or twenty code ringing current interrupter.

A further object of this invention is to provide a connector adapted for use as a ten party connector with either ten or twenty code interrupters, for use as a twenty party connector, for toll switching, delayed ringing, and for extending proper supervision and recall signals.

These and other objects are accomplished by means of a ringing generator switching circuit comprising means for eliminating the twenty party code ringing pulse so that a standardized ten party code connector may be used throughout the exchanges without regard as to whether the interrupter provides for ten or twenty code ringing. More particularly, the invention lies in a versatile connector adapted to perform many varied functions such as ten or twenty party code ringing, P. B. X trunk hunting, toll switching, delayed ringing, and the like. An important feature of the invention involves a generator switching circuit adapted to switch "on" just after and to switch "off" just before the twenty party code pulse so that only the regular ten party codes are transmitted to the connector.

It is thought that these and other objects of the invention may be explained best by a description of the aaccompanying drawings in which.

Figures 6, 9, 10, 11:
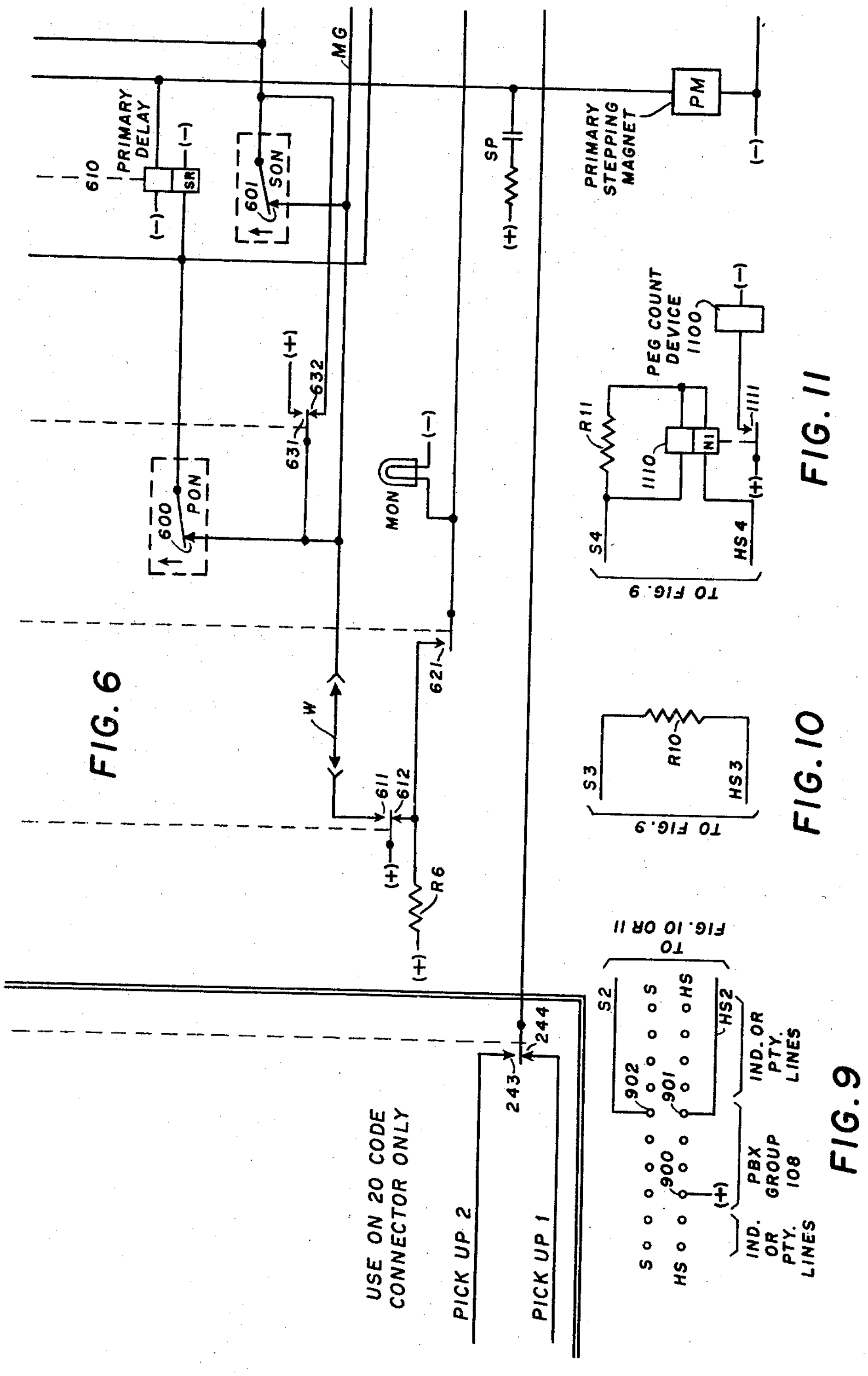
Figure 7:
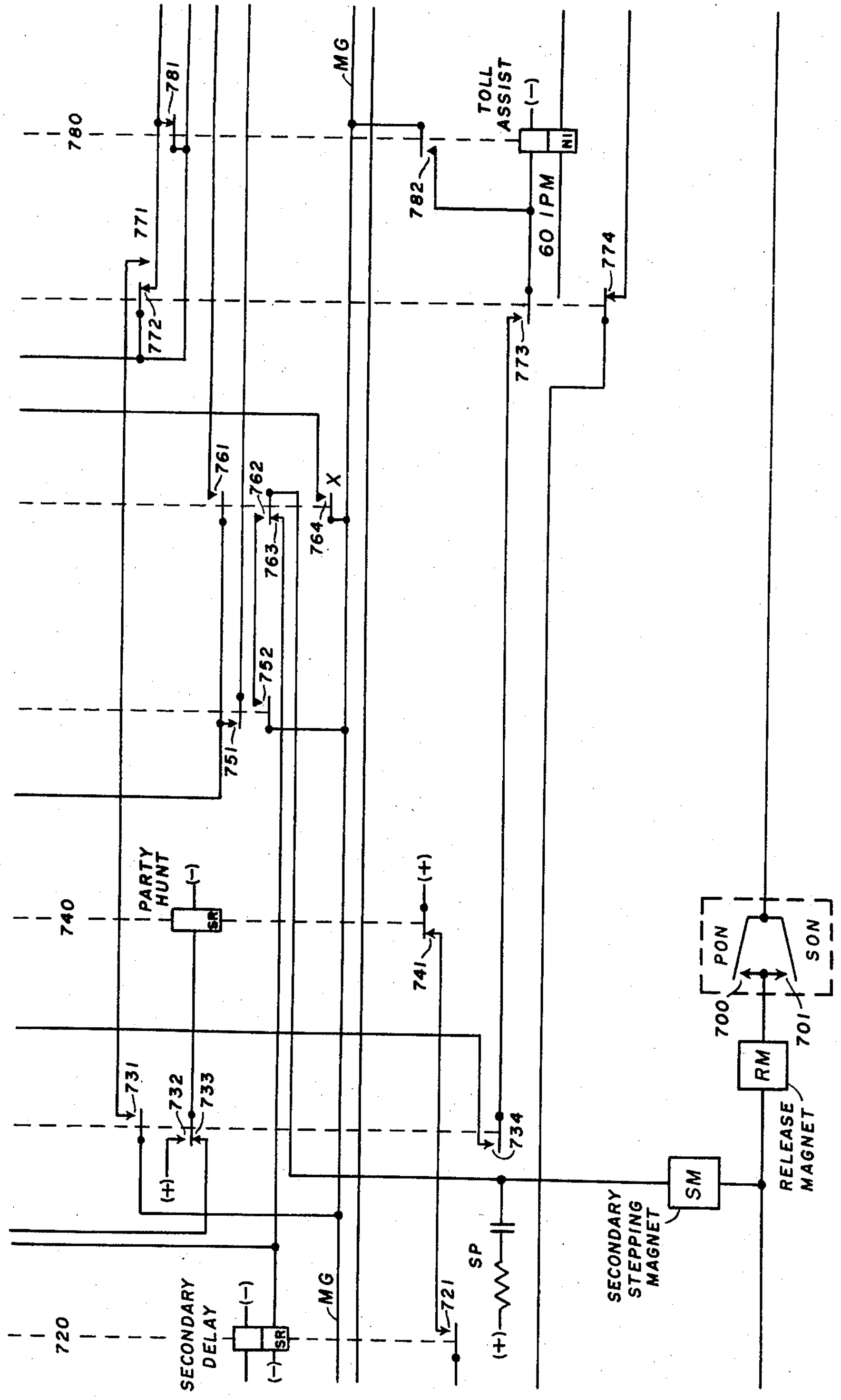
Figures 8, 13:
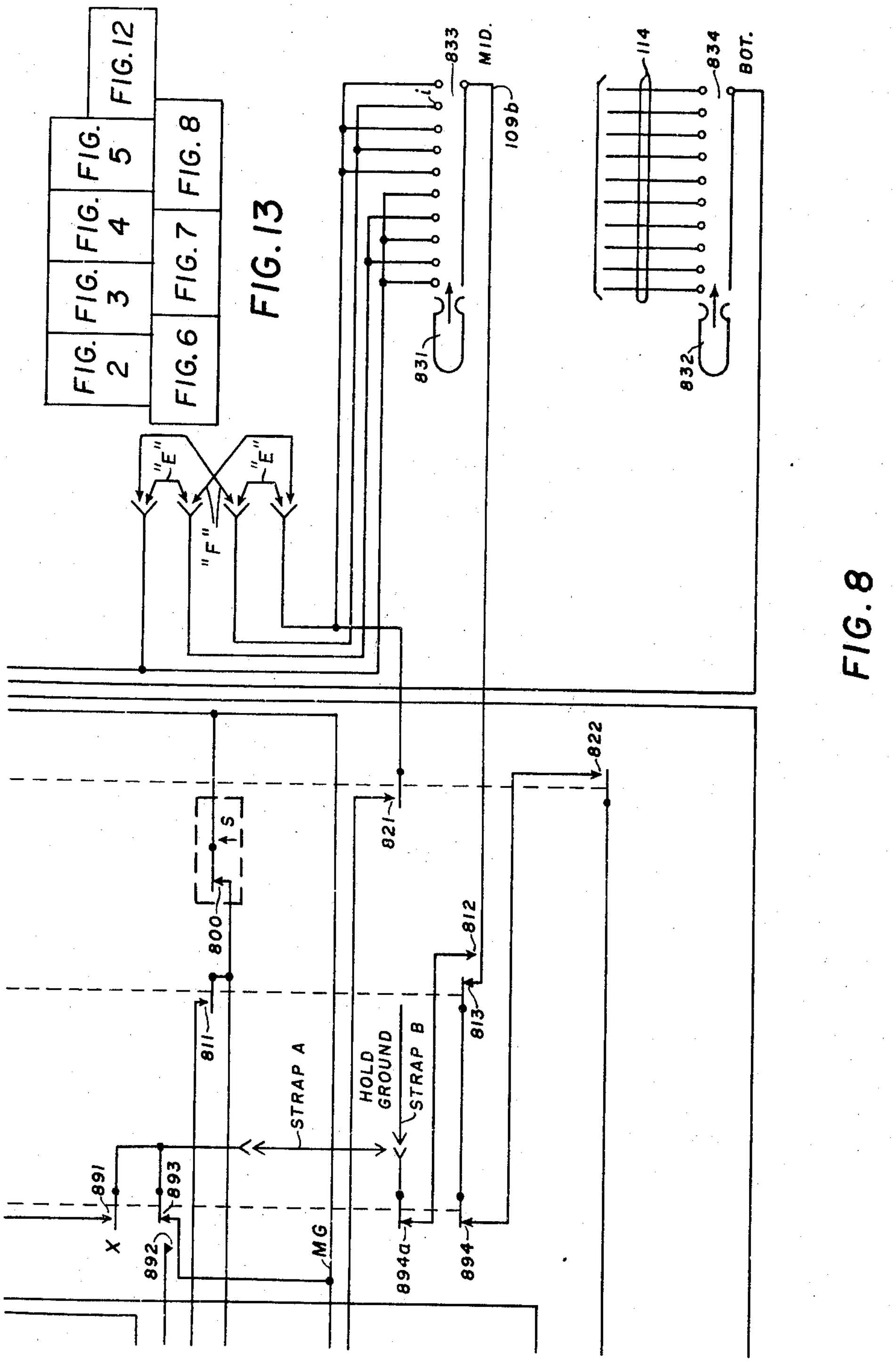
Figure 12:
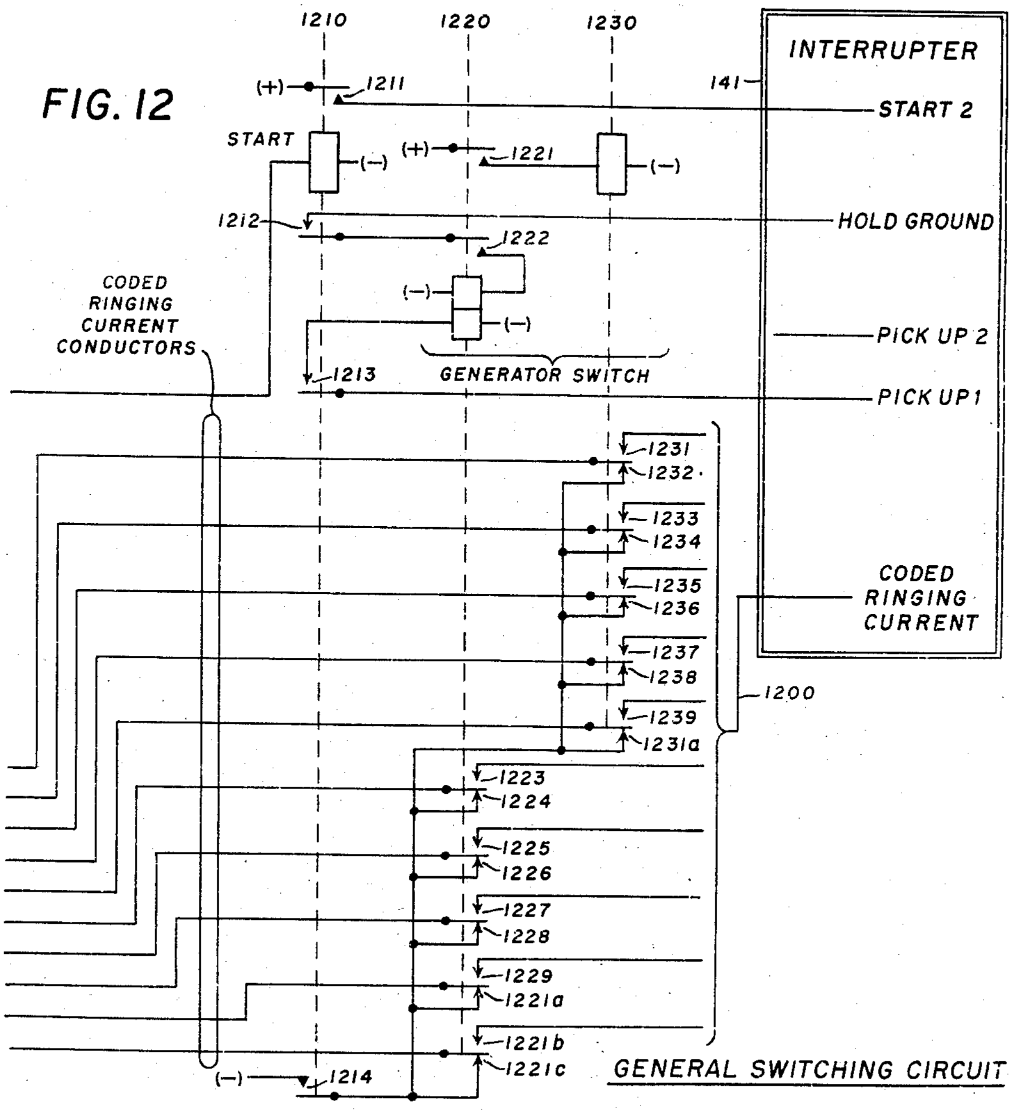
Figure 14:
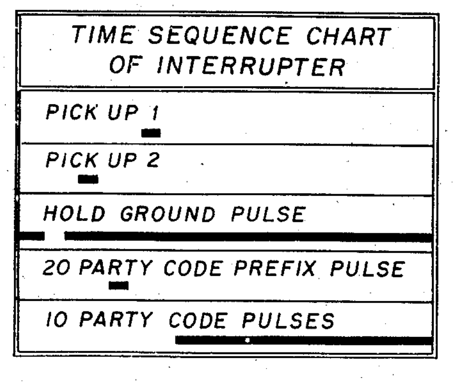

Figs. 9, 10 and 11 illustrate means for controlling P. B. X trunk hunting;

Fig. 12 shows the generator switching circuit used to eliminate the twenty party code pulse;

Fig. 13 shows the manner in which Figs. 2–8 and 12 should be arranged to provide a complete circuit; and Fig. 14 shows the sequence of pulses and signals produced by the interrupter circuit. It should be understood that this figure shows only one cycle of the interrupter. In actual practice this cycle is repeated sequentially as long as the interrupter is functioning.

In the drawings, the source of potential is shown by plus (+) and minus (—) signs. As in the case in most telephone circuits the plus (+) potential is described as connected with ground and the minus (—) potential is described as battery. It should be understood that this or any other suitable power source may be used.

The connector circuits of Figs. 2–8 are designed to show both ten and twenty code connector switches to illustrate how the output of an interrupter may be used under various circumstances. The twenty code connector switch using twenty code interrupters comprises code switching relay 240 and its contacts which are used to switch between pick-up conductors 1 and 2. Also, the strap "B" (left side of Fig. 8) is used and strap "A" is omitted in the case of the twenty code connector, and in addition thereto the generator switching circuit of Fig. 12 is not provided. On the other hand, for all ten code connectors using twenty code interrupters, strap "A" and the generator switching circuit of Fig. 12 are used while strap "B" and code selecting relay 240 are omitted. Also, in the case of the ten code connectors, the armature of contacts 774 is connected by any suitable means (not shown) directly to the pick-up 1 conductor in the interrupter, without the intervention of contacts 244 and 243. When the ten party connector is used with a ten party interrupter, the connections include strap "B," omit strap "A," and connect the pick-up pulse source to the armature of contacts 774.

Figure 1:
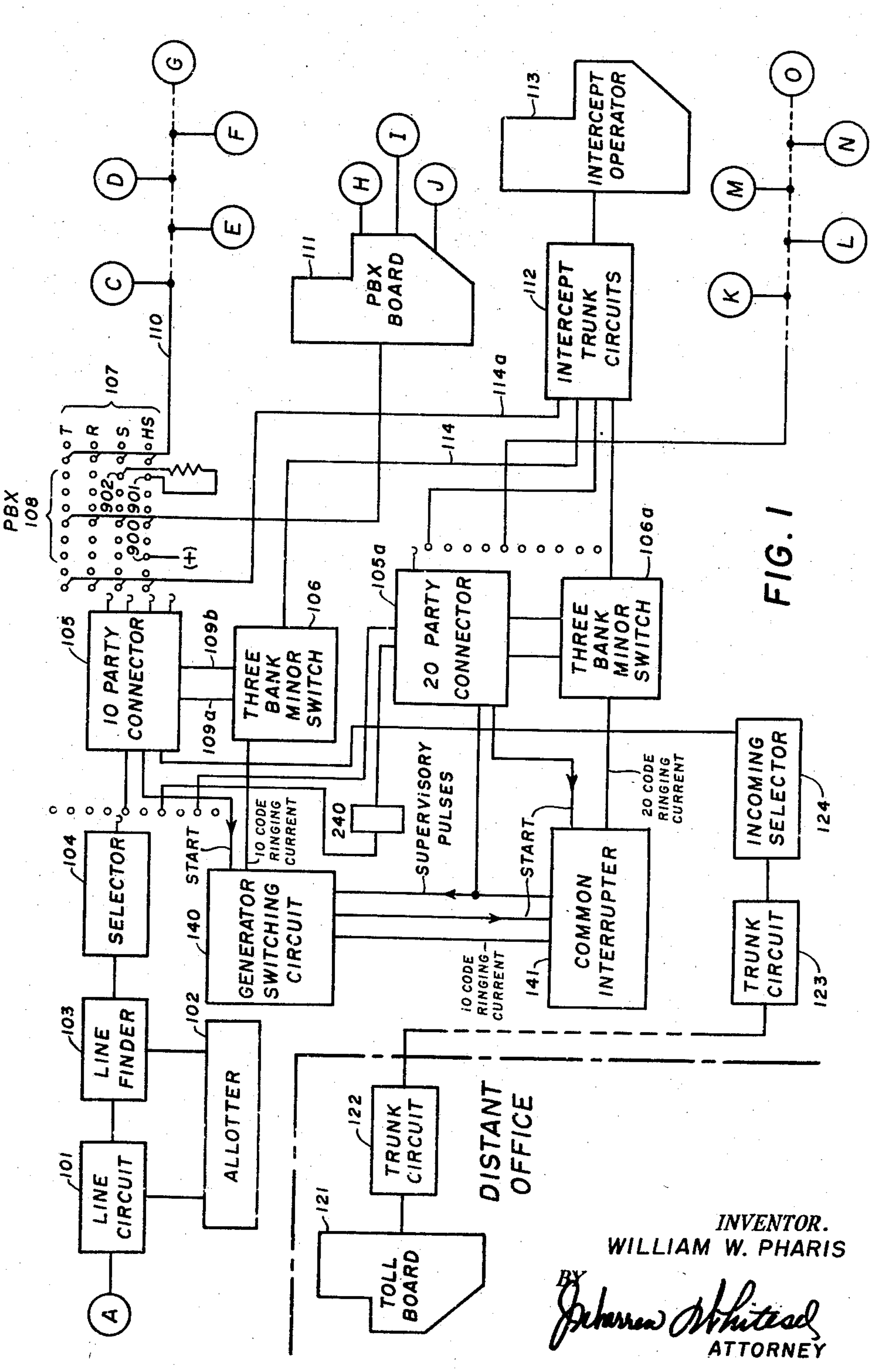
Fig. 1 shows, by means of a block diagram, a telephone system which is adapted to use a connector and a generator switching circuit that include my invention.

Referring first to Fig. 1, there is shown means for completing a call either from a subscriber or a toll board to any one of several different called subscribers, depending upon the position to which one of the connectors 105 or 105*a* is directed by impulses transmitted from the calling station or toll board.

The small circles shown to the right of connector 105 indicates particular trunks in a given level to show how a connector level may be wired, while each of the small circles shown to the right of selector 104 and connector 105*a* indicates a level in the switch.

In greater detail, the subscriber at station A initiates a call by removing his receiver or handset responsive to which line circuit 101 causes allotter 102 to direct line finder 103 to seize the calling subscriber line. Then, dial tone is transmitted from selector 104 to the calling subscriber. Responsive thereto, he dials a suitable directory number for causing selector 104 to seize an idle connector such as 105, for example. The next two digits to be transmitted from the calling line are used to set connector 105, while the last digit is used to set minor switch 106.

If connector 105 seizes the first set of terminals, and further if minor switch 106 indicates that the call is to be intercepted, a marking is extended over conductors 114 and 114*a* to trunk circuit 112 for signaling operator 113 to intercept the call.

On the other hand, if connector 105 is directed to its third set of terminals, a marking is extended from contact 900 in the auxiliary bank HS to cause connector 105 to hunt for an idle trunk in P. B. X group 108 if the first trunk is busy. If no idle trunk is found, hunting continues over the entire P. B. X group until a set of terminals is reached wherein the corresponding terminals in sleeve bank S and auxiliary bank HS are interconnected by a suitable resistor, as is shown at contacts 901 and 902.

If connector 105 is directed to the ninth set of terminals, a marking is extended from minor switch 106 over conductors **109*a* and 109*b*** to determine the particular side of the line over which ringing current is to be transmitted and to forward a particular code which selects between subscribers C–G.

Still another call may be that extended from toll board 121 over trunk circuits 122 and 123, incoming selector 124, and connector 105, to a called subscriber. In this case, the circuit functions in the manner described in connection with the calls from subscriber A, except that a toll marking is forwarded to connector 105 for preventing the transmission of ringing current to the called subscriber until such time as the operator may see fit to perform another function for forwarding ringing current. Means is provided in connector 105 for returning supervision over an auxiliary conductor in this type of call. Still further means is provided for affording the operator at toll board 121 means for resignaling either the called subscriber or operator, as required.

Calls through twenty party connector **105*a* are just about the same as those through ten party connector 105. The difference is in the manner in which ringing current is applied. For example, when ten party connector 105 is seized, a signal is transmitted over a suitable start conductor to generator switching circuit 140 which relays the signal to start the common interrupter 141. Responsive thereto, certain supervisory pulses are transmitted from the common interrupter to the generator switching circuit. More particularly, the supervisory pulses are shown in Fig. 14. Switching circuit 140 is turned "on" after the twenty party code pulse by pick-up pulse 1 and is held thereafter by the hold ground pulse which goes off after the ten party code pulse and before the twenty party code pulse is produced on the next cycle. In this manner the generator switching is conditioned to transmit the ten code ring current output from interrupter 141 to connector 105** but to delete the twenty code ringing pulse.

On the other hand, when the twenty party connector **105*a* is seized, all twenty codes are used. In this case, ringing generator switching circuit 140 is not used as it has absolutely nothing to do with a call through a twenty party connector. Responsive to seizure, a signal is transmitted from connector 105*a* over a start conductor to the common interrupter 141 which in turn forwards certain supervisory pulses to connector 105*a*. If connector 105*a* was seized over the seventh level of selector 104, relay 240 operates to select pick-up pulse lead 2 and the twenty party code prefix pulse of ringing current is used. On the other hand, if connector 105*a* is seized over the ninth level of selector 104, relay 240 is not operated and pick-up pulse lead 1 is used so that the twenty party code prefix pulse is eliminated. Hence, it is seen that connector 105*a*** can select between any of twenty codes depending jointly on the path of access and operation of the minor switch.

It is thought that a more complete understanding will be had by a detailed description which is directed first to a call from subscriber A to subscriber C via ten party connector 105.

*Call from subscriber A to subscriber C*

The first call to be described will be one from subscriber A to a ten party line subscriber such as C, for example. Subscriber A initiates the call by removing his handset to cause the operation of line circuit 101, allotter 102, and line finder 103. Following this, selector 104 returns dial tone to subscriber A who responds by dialing any suitable number of digit trains according to the requirements of the system. In the system shown, at least four digits are required. The first sets selector 104 to a particular level after which it searches automatically for an idle connector such as element 105, for example. Responsive thereto, a circuit is completed for seizing connector 105 and the next two digits are used to set it. The last digit is used to control minor switch 106 for selecting the proper circuit to signal the called subscriber.

Since the invention relates to the operation of generator switching and code selecting means, it is assumed that the call has proceeded in a conventional manner to this point; therefore, the detailed description is limited to its particular features which are shown in Figs. 2–12 when arranged as illustrated in Fig. 13. It should be understood that any suitable, well known equipment may be used for elements not described except by means of hollow boxes in Fig. 1.

*Seizure*

The connector circuit is seized when a loop is completed across tip T and ring R conductors for operating calling bridge relay 220. This relay performs the dual purpose of supplying talking battery to the calling subscriber and of responding to digit pulses. The circuit for operating this relay extends from ground (+) through the upper winding of calling bridge relay 220, over contacts 211, tip conductor T the calling subscriber's loop, via selector 104, line finder 103 and line circuit 101, and returns over ring conductor R and contacts 214 to (−) battery by way of the lower winding of calling bridge relay 220.

Responsive to the operation of relay 220, a circuit is completed for operating release delay relay 230. The purpose of this relay is to hold the connector and related circuits throughout digit pulsing when relay 220 is released and reoperated sequentially. The circuit for operating relay 230 may be traced from ground (+), through contacts 201 and 221 to (−) battery, through the winding of the release delay relay. Contacts 621 close to light monitor lamp MON brightly from ground which is extended over contacts 612 and 621. This light is an indication to maintenance personnel as to the condition of the connector, i. e., bright when the called party is not connected, dim when he is, and flashing when digit pulses are received. Also resposive to operation of relay 230, contacts 232 close to extend ground (+) over sleeve conductor S for holding preceding equipment in an operated condition that is necessary to maintain the talking circuit. Contacts 233 close to prepare a circuit for switchthrough relay 520; contacts 234 open to prevent an inadvertent or premature release; and contacts 631 close to operate primary delay relay 610, secondary delay relay 720 and party delay relay 330.

It might be noted that contacts 631 of release delay relay 230 (and later contacts 611 of answer bridge relay 210) provide ground for numerous operations; therefore, this ground hereinafter will be called "master ground" and conductor MG to which it connects will be called the "master ground conductor."

The purpose of these delay relays is to distinguish between various pulse trains to be received by the connector. Each of these delay relays is operated over a circuit including a set of off-normal contacts. Responsive to a switch movement, this original operating path is broken and the particular delay relay is thereafter held during a digit pulse train in series with pulsing contacts 222 on calling bridge relay 220. The delay relay then depends upon its slow release characteristics to hold it operated while the pulsing contacts are open. Following receipt of the last pulse in that particular pulse train, the delay relay releases to prepare the switch for its next operation.

The primary delay relay operates over contacts 631 and 600. A circuit to operate secondary delay relay 720 may be traced from ground (+) applied over operated contacts 631, secondary off-normal contacts 601, and through the upper winding of secondary delay relay 720 to (−) battery. Party delay relay 330 operates over the circuit which may be traced from ground (+) through operated contacts 631, master ground conductor MG, resting minor switch off-normal contacts 531 to (−) battery through the upper winding of party delay relay 330.

Primary delay relay 610 closes contacts 317 to prepare the first digit pulsing path. This path extends from (−) battery through the winding of the magnet PM and in parallel therewith from (−) battery through the upper winding of relay 610, then over operated contacts 317, 333 and 235 to open pulsing contacts 222. Primary delay relay 610 also controls a circuit at contacts 311—314 for applying ringing current to the called line; however, this circuit has no purpose at this time.

Upon operating, secondary delay relay 720 closes contacts 321 for applying an alternate ground (+) marking to sleeve conductor S which has no purpose at this time. At contacts 324, secondary delay relay 720 prepares the secondary pulsing path to magnet SM by way of contacts 763.

Party delay relay 330 closes contacts 333 noted above as being in the pulsing connection to the various magnets. In addition thereto, party delay relay 330 closes contacts 732 thereby operating party hunt relay 740. The purpose of this relay is to aid in trunk hunting when the call is to a P. B. X. It has no function at this time. Partly delay relay 330 opens contacts 331 and 332 to prevent false supervision over sleeve conductor S and hunt sleeve conductor HS' on other than P. B. X calls.

*Dialing*

The circuit is now ready to receive the first digit pulse train to be transmitted from a calling subscriber station into the connector circuit. This digit pulse train is in the form of a plurality of open loop breaks in the circuit extending from contacts 211 and 214 to the calling subscriber station by way of conductors T and R. Since calling bridge relay 220 is held operated in series with this loop circuit, it releases upon receipt of each digit pulse to open contacts 221 while closing contacts 222. Release delay relay 230 is de-energized upon receipt of each pulse. Upon completion of each incoming impulse, contacts 221 reclose to re-energize release delay relay 230. It does not release during pulsing due to its slow release characteristics.

Responsive to the receipt of the first digit pulse, a circuit is completed from ground (+) applied over release magnet interrupter contacts 201, release contacts 222, operated contacts 235, 333 and 317 to (−) battery by way of the winding of primary stepping magnet PM and in parallel therewith to (−) battery through the upper winding of primary delay relay 610. The mechanism of the switch (not shown) is such that each time that magnet PM operates, the switch takes one step in its primary direction. Moreover, responsive to the first step in the primary direction, primary off-normal contacts 500, 600 and 700 operate. Contacts 500 close so that ground (+) is extended to the interrupter start conductor from contacts 497 and in parallel therewith from contacts 526. This ground marking causes start relay 1210 to operate and forward ground at contacts 1211 over start conductor 2 to interrupter 141 to start it for supplying many of the control currents such as ringing current, busy tone, ring-back tone, pick-up, hold ground and the like. For more details on this feature, see the section below entitled "Generator switching." Contacts 700 are of no importance at this time. Primary off-normal contacts 600 opened to break the original operating path for primary delay relay 610. This path formerly extended from ground (+) on contacts 631. After operation of contacts 600, primary delay relay 610 is held solely from (−) battery extended through its upper windings, its locking contacts 317, to ground (+) by way of contacts 333, 235, 222 and 201. Contacts 222 open and close during pulsing. The characteristics of relay 610 are such that it holds during this pulsing of contacts 222 but that following receipt of the last digit pulse (when contacts 222 are held open), primary delay relay 610 releases. Contacts 621 open so that monitor lamp MON is flashed on each digit pulse. The flashing lamp indicates to maintenance personnel the receipt of dial pulses by the connector switch.

The switch continues to step in its primary direction until receipt of the last digit pulse, at which times contacts 222 remain open long enough for primary delay relay 610 to release. This in turn opens contacts 317 thereby switching the pulsing path from magnet PM. Contacts 316 close thereby preparing the pulsing circuit for magnet SM and secondary delay relay 720 in parallel. Contacts 311—314 return to normal, they have no function at this time.

The switch is now ready to respond to the second digit pulse train. Responsive to the first open loop pulse in the second pulse train, calling bridge relay 220 releases and completes a circuit to step the switch one step in its secondary direction. This pulsing circuit may be traced from ground (+) over rest contacts 201, rest contacts 222, operated contacts 235, operated contacts 333, rest contacts 316, operated contacts 324, to (−) battery through the lower winding of secondary delay relay 720, and in parallel therewith through rest contacts 763, to (−) battery by way of the winding of magnet SM. The mechanism of the switch is such that the switch takes one step in its secondary direction responsive to each operation of magnet SM.

Responsive to the first step in the secondary direction, secondary off-normal contacts 601 and 701 operate. Contacts 601 break the original energizing path to secondary delay relay 720. Contacts 701 have no function at this time. The secondary delay relay is now held over its lowermost winding to the pulsing ground which is by way of contacts 324, 316, 333, 235, 222 and 201. This relay continues to be held operated throughout receipt of the second digit pulse train due to its slow release characteristics.

The connector follows each digit pulse so that its brushes T', R', S' and HS' are directed to the terminal contacts of the called line. Following receipt of the last digit pulse in the second series, secondary delay relay 720 releases. An alternate ground marking is removed from sleeve conductor S at contacts 321. At contacts 324, the pulsing path is disconnected from both magnet SM and secondary delay relay 720. At contacts 323, the pulsing path is connected to control party delay relay 330, and in parallel therewith stepping magnet MS of the minor switch. The minor switch is a device which is used to forward selected ringing currents, to select the particular code and the side of the line that is to be used to ring the called party. The minor switch also provides for an intercept feature which is not material to this invention.

The connector is now prepared to receive the third and final digit which is a party line subscriber designation digit. Once again, calling bridge relay 220 responds to each open loop pulse by closing contacts 222 and opening contacts 221. As in the case of the previous two digits, release delay relay 230 remains operated during the receipt of each digit pulse train due to its slow release characteristics. The pulsing circuit is used now to drive the minor switch one step for each pulse received. The circuit for causing this function extends over contacts 201, 222, 235, 233, 316, 323 to (−) battery by way of the winding of party delay relay 330 and in parallel therewith through the winding of minor switch stepping magnet MS. Party delay relay 330 has its original operating path opened by minor switch off-normal contacts 531 when the switch takes its first step. Relay 330 now holds via pulsing contacts 222 in parallel with the minor switch stepping magnet. Due to its slow release characteristics, relay 330 does not restore during the last digit pulse train; however, responsive to termination of the third digit pulse train, contacts 222 remain open long enough for party delay relay 330 to release. The function of the circuit thereafter is dependent upon a number of things such as whether the called line is busy, the call is to be intercepted, or other features.

The intercept feature is controlled by wiper 832. If the third digit directs the minor switch to a terminal indicating call intercept, a circuit is completed through bank level 834 over cable 114 to cause intercept trunk circuit 112 to divert the call to intercept operator 113. This feature is not material to applicant's invention; therefore, it will not be explained further. Reference is made to my copending application Serial No. 324,436, filed December 6, 1952, now Patent 2,706,750, for a description of one possible operation of this type.

*Busy line*

Next, it is assumed that the called line is busy. In the particular circuit in which the subject invention is described, a busy line is marked by ground applied to the S' conductor; although, it should be understood that other markings could be used also.

Following the receipt of the last digit pulse train, party delay relay 330 releases. At contacts 732, it opens the circuit to party hunt relay 740; however, this relay is slow to release so that it remained operated during a brief interval of time. During this interval, a circuit is completed for busy test relay 510 at which time a test is made to determine whether the called line is busy or idle. If it is busy, a ground marking is applied to sleeve conductor S' which is extended over contacts 331, 348 and 523*a* to (−) battery through the upper winding of the busy test relay 510.

Relay 510 operates and at contacts 517 opens the circuit including the operate winding of switchthrough relay 520 thereby preventing this relay from operating. At contacts 514, a circuit is prepared for returning busy tone to the calling subscriber after a brief interval and when party hunt relay 740 releases. The circuit for return of busy tone then includes contacts 514, 341, 522, the upper winding of answer bridge relay 210 and over tip conductor T to the calling subscriber. At contacts 516, a circuit is completed for extending 60 pulses per minute from a common interrupter to a switchboard operator; however, this feature is not important at this time since it was assumed that the call was from subscriber A. Busy test relay 510 locks at its own contacts 518 over the circuit from (−) battery through the upper winding of busy test relay 510, rest contacts 523*a*, 347, operated contacts 518 and 233, to ground (+).

Upon hearing busy tone, the calling subscriber hangs up and the circuit releases in the manner described below in the section entitled "Release," except that this time the release circuit is traced from magnets RM and MR through closed contacts 525*a* and 234 to the release alarm conductor because switchthrough relay 520 has not operated at the time of the busy test; however, it will have operated when the release feature is described.

*Switchthrough*

Next, it is assumed that the called line is idle and that a circuit is completed for operating switchthrough relay 520, and another circuit is completed for extending ringing current to signal the called subscriber.

More specifically, in the circuit that is shown, there is a (−) battery marking on sleeve S' since the called line is idle. Therefore, busy test relay 510 is not operated during the slow release time interval of party hunt relay 740. Hence, following release of relay 740, a circuit is completed for operating switchthrough relay 520. That is, if the sleeve wiper encounters an idle line, a (−) battery marking is placed on sleeve conductor S' for operating switchthrough relay 520 over a circuit which may be traced from (−) batery through sleeve conductor S', contacts 331, 342, through the upper winding of relay 520, contacts 517 and 233 to ground (+).

Upon operating, switchthrough relay 520 closes a locking circuit to its lower winding via: (−) battery, preliminary contacts 524*a* and master ground conductor MG to master ground (+) on contacts 631. A part of the talking circuit is completed to the called party at contacts 521 and 525. At contacts 525*a*, the circuit from the release alarm conductor is opened to prevent a premature release. A circuit is prepared for answer bridge relay 210 at contacts 523 and 524. At contacts 526, one of the alternate ground (+) markings applied to the start conductor is removed; however, there is no circuit change due to the ground (+) marking extended from contacts 497 on ring-trip relay 490. Contacts 527 close to apply a ground (+) marking to sleeve conductor S, thereby guarding the called line against seizure from another connector switch. Contacts 528 close to forward any suitable marking from the HS' conductor to the intercept circuit. Contacts 529 open and 521*a* close; however, this operation is important on toll calls only. Contacts 522*a* close to control busy test relay 510.

*Ringing*

At this time, it might be well to recall that on ten party connectors strap "A" is used and strap "B" is omitted.

This time that busy test relay 510 operates it is used to control the application of ringing current and has nothing to do with whether the called line is busy or idle. The circuit for operating relay 510 extends from (−) battery through its upper winding, operated contacts 522*a*, one of the terminals in bank 833 depending on the position to which the minor switch was operated and depending on the side of the line over which ringing current is to be sent, wiper 831 and its associated shorting bar, contacts 813, 894, 822 and 774 to the pick-up conductor. This conductor connects to the common interrupter which applies a ground pulse at the start of each ringing code period. More specifically, no ringing current may be applied to the line until relay 510 operates to close its contacts 512 and relay 510 may not operate until just before the start of a ringing code. Hence, means is provided to prevent transmission of a distorted code. (A different operating path for relay 510 on other steps of the minor switch is described below in the subsection on the interlock feature.)

Ring-back tone (a portion of the ringing current in this case) is extended from the ringing generator over a terminal in bank 535 of the minor switch, brush 534 and shorting bar, conductor 109*a*, contacts 513 and 524 to ring conductor R. This current provides a signal to the calling party to indicate that the called line is being rung.

Busy test relay 510 also opens contacts 517; however, switchthrough relay 520 continues to hold over its own locking contacts 524*a* to master ground (+) at contacts 631 via conductor MG.

At this point it might also be well to explain how bank 833 of the minor switch is arranged to select between transmitting ringing current over tip conductor T' and transmitting ringing current over ring conductor R', according to the position to which the minor switch has been stepped and according to the use of either the E-wiring or the F-wiring. More specifically, if the E-wiring is used and the F-wiring is omitted, party selecting or ringing digits 1 to 5 are used to ring-out over ring conductor R' and digits 6 to 0 are used to ring-out over tip conductor T'. On the other hand, if the F-wiring is used and the E-wiring is omitted, odd party selecting or ringing digits are used to control the transmission of ringing current over conductor R', while even digits control the transmission of ringing current over conductor T'. Depending upon the inclusion of either the E or F wiring, and further depending upon the position to which wiper 831 has been directed, a circuit may be completed for reoperating primary delay relay 610. For example, suppose that the E-wiring is used and that the minor switch has been directed to its ninth step (marked by the letter *i*), a circuit for operating primary delay relay 610 extends from (−) battery through the lower winding of relay 610, contacts 821, the E-wiring, the ninth terminal *i* in bank 833, brush 831 and the shorting bar, conductor 109*b*, rest contacts 813 on busy test relay 510, rest contacts 894 on ring-trip relay 490, rest contacts 822 on switchthrough relay 520 to ground (+) applied by the pick-up conductor through contacts 774. On the other hand, if the F-wiring were used so that there were no ground marking on the ninth terminal *i*, there would be nothing to reoperate primary delay relay 610 which would then remain in a released condition throughout ringing.

An interlock feature is provide between relays 610 and 510 to forestall any possible faulty operation whereby relay 510 operates before relay 610 so that ringing current is transmitted over the wrong side of the called line. If primary delay relay 610 is to operate and an attempt is made to trace a circuit to operate busy test relay 510 an open set of contacts is reached in bank 833. For example, assuming that the minor switch is resting on the ninth terminal *i* and that the E-wiring is used, there is no path which may be traced through bank 833 to operate relay 510. There is a path via the lower winding of relay 610, contacts 821, the E-wiring, terminal *i*, brush 831, conductor 109*b*, contacts 813, 894, 822 and 774 to pick-up ground for operating relay 610. Responsive thereto, relay 510 operates over a circuit which may be traced from (−) battery through the upper winding of busy test relay 510, contacts 522*a*, 315, 821, the E-wiring, terminal *i*, conductor 109*b*, contacts 813, 894, 822 and 774 to ground on the pick-up conductor. Hence, it is seen that an interlock feature is provided to prevent operation of relay 510 before relay 610 when the position of the minor switch indicates that ringing current is to be transmitted over the tip side.

With relay 610 operated, the circuit for ringing the called subscriber extends from ground (+) applied to operated contacts 314, rest contacts 471 and 495, to the called subscriber station over ring conductor R' and back over tip conductor T', contacts 521, 491 and operated contacts 312 on operated primary delay relay 610, the upper winding of ring-trip relay 490, operated contacts 512, conductor 109*a*, the shorting bar, brush 534, and a particular ringing generator conductor in bank 535 depending upon the position to which the minor switch was directed by the third or party selecting digit. On the other hand, if primary delay relay 610 is not operated because brush 831 is resting on an unmarked terminal, the path for ringing current may be traced from ground (+) applied to rest contacts 311 on unoperated primary delay relay 610, over contacts 491 and 521, tip conductor T', the called station, and back over ring conductor R', operated contacts 525, rest contacts 495 and 471, rest contacts 313 on unoperated primary delay relay 610, to the ringing generator through the upper winding of ring-trip relay 490, operated contacts 512, conductor 109*a*, shorting bar and brush 534, to the particular terminal in bank 535 to which the minor switch was directed on the third digit.

*Generator switching*

The interrupter is adapted to put out, among other things, the currents shown in Fig. 14. This chart is a time sequence showing of one cycle of the interrupter. Beginning at the left of the chart at time zero, there is a holding ground which is removed momentarily after a very short period. The holding ground is reapplied and continues until the end of the cycle and into the beginning of the next cycle at which time there is another momentary interruption. The purpose of this marking is to hold equipment operated until the end of a complete cycle, thus preventing the transmission of the first portion of ringing codes 11 to 20 when ringing codes 1 to 10 only are being used.

Shortly after the holding ground is reapplied, a pick-up pulse (2) is produced. The purpose of this pulse is to initiate a circuit operation, if there is to be one at this time.

Next, the twenty party code pulse of ringing current is produced. This is merely a prefix comprising one short ring and is used to distinguish between codes 1–10 and 11–20, i. e., the presence of the twenty party pulse indicates a call to the group 11–20. This pulse is provided in some interrupters but not in others. Except for this pulse the output of most interrupters is substantially the same; therefore, if the transmission of this pulse can be controlled on a selective basis it should be possible to use the same ten party selectors in connection with each type of interrupter.

Following the twenty party code pulse, there is another pick-up pulse (1) which may be used to initiate another circuit operation. The principle is that if the twenty party code pulse is to be used, pick-up pulse (2) is used to trigger ringing while, if the twenty party code pulse is not to be used, pick-up pulse (1) is used to trigger ringing after the twenty party code pulse has been terminated.

After completion of pick-up pulse (1), ten code pulses of ringing current are produced. Each separate code is transmitted over a separate conductor that is part of the cable 1200. Or stated another way, a different code of ringing current is applied to each terminal in bank 535 during the time that the interrupter is in that portion of its cycle that lies between the occurrence of pick-up pulse (1) and the break in the hold ground.

This cycle is repeated sequentially as long as the interrupter is operating.

The generator switching circuit of Fig. 12 is designed to eliminate the twenty party code ringing pulse so that only the ten party code pulses are delivered to the connector. In this manner, a standardized ten code connector may be used at all times. Upon seizure of a connector which is to have access to ringing current via Fig. 12, a start ground (+) marking is transmitted via contacts 497, 500 and the start conductor to operate start relay 1210. This relay forwards a ground (+) marking via contacts 1211 and start 2 conductor to start the interrupter. Responsive to the first pick-up pulse (1), generator switching relay 1220 operates, the circuit being via contacts 1213. This relay closes its contacts 1222 to lock to the hold ground conductor. It also closes contacts 1221 to operate generator switching relay 1230. These two switching relays operate contacts 1223 to 1221*c* and 1231 to 1231*a* to connect the ten party coded ringing conductors to the terminals of bank 535. When the hold ground is opened, relays 1220 and 1230 release to restore contacts 1223 to 1221*c* and 1231 to 1231*a*, thereby removing ringing current from the bank of switch 535. Upon inspection of the timing chart of Fig. 14, it is seen that generator switching relays are operated after and released before the twenty party code pulse; hence, only the codes which are necessary for ten party service are transmitted to the connector switch.

It might be noted that (−) battery is superimposed on the ringing current in the interrupter and that the connector would not function properly if this battery were removed, for example the ring-trip relay could not operate until the start of a new code period. Therefore, when contacts 1223 to 1221*c* and 1231 to 1231*a* are restored, a (−) battery is connected to the ringing leads.

As pointed out before, the chief difference between a twenty party interrupter and a ten party interrupter is that the ten party interrupter does not produce a twenty party code prefix pulse and one of the pickup pulses. Hence, there is no need for Fig. 12 to adapt the connector shown in the remainder of the drawings to use ten party interrupters. It would only be necessary to connect the coded ringing current conductors from the interrupter to bank 535 of the minor switch. Hold ground would be applied at strap "B." Strap "A" would be omitted. The only pickup conductor extending from the interrupter would be connected directly to the armature of contacts 774.

*Answer*

When the called party answers and removes his receiver to complete a direct current loop across the line comprising tip T′ and ring R′, a path is completed for half-operating ring-trip relay 490. This path is over that traced for the ringing current, i. e., ringing generator, coded ringing current conductors, bank 535, brush 534, conductor **109*a*, contact 512, the upper winding of relay 490, contacts 313, if relay 610 is unoperated, contacts 471, 495, 525, conductor R′ the called subscriber's loop, conductor T′, contacts 521, 491 and 311 to ground (+). Ring-trip relay 490 is a two step relay arranged so that its "X" or preliminary contacts 891 operate on the first step and contacts 893 break on the second step; therefore, the secondary delay relay operates on the first step. This circuit extends from (−) battery through the upper winding of secondary delay relay 720, contacts 891 and 893, to master ground (+) on contacts 631 via conductor MG. Relay 720 closes contacts 322 thereby completing a circuit for fully operating ring-trip relay 490. This circuit extends from (−) battery through the lower winding of relay 490, contacts 772, 322, 532, to master ground (+) on contacts 631 via conductor MG. Ring-trip relay 490 is completely energized and locks over a circuit including its lower winding, contacts 781 and 772 in parallel, locking contacts 892 to master ground (+) at contacts 631. Responsive to the operation of ring-trip relay 490, contacts 492 and 494 close thereby completing the talking circuit to the called subscriber, while contacts 491 and 495 open to remove ringing current. Ground (+) is removed from the interrupter-start conductor at contacts 497. Start relay 1210 releases to remove ground (+) from start 2 conductor at contacts 1211**. This stops the interrupter if no other circuit is then applying ground to a start conductor.

Contacts 893 and **894*a* open to release busy test relay 510. It had locked to master ground conductor MG via contacts 893, strap "A", contacts 894*a*, 812, minor switch bank 833, and contacts 522*a*. Relay 510 removes ringback tone at contacts 513. Contacts 893 also release primary delay relay 610, if it is then operated. It was holding via its lower winding and contacts 821, 812, 894*a*, strap "A", contacts 893 and 631. Contacts 496 close to apply ground (+) to the upper winding of answer bridge relay 210. This circuit may be traced from ground (+) over operated contacts 496 on ring-trip relay 490, operated contacts 523 on switchthrough relay 520, through the upper winding of answer bridge relay 210, to tip conductor T, operated contacts 492 and 521, tip conductor T′, through the loop completed when the called subscriber removed his receiver, and back over ring conductor R′, operated contacts 525, 494, 524 and 493 to (−) battery by way of the lower winding of answer bridge relay 210**. The purpose of this relay is to furnish battery for talking current to the called party.

Answer bridge relay 210 operates and reverses the direction of battery flow applied to the calling line from the windings of calling bridge relay 220. Before answer bridge relay 210 operated, the battery feed for the calling line extended from ground (+) through the upper winding of calling bridge relay 220 and out over tip conductor T by way of contacts 211. The (−) battery connection extended through the lower winding of calling bridge relay 220 and out over ring conductor R by way of contacts 214. Now, after the answer bridge relay operates, (−) battery is extended over tip conductor T by way of operated contacts 212, while ground (+) is extended over ring conductor R by way of operated contacts 213. Contacts 215 and 216 have no function on this call.

Contacts 611 close to apply an alternate master ground (+) in parallel with that previously applied by way of contacts 631 if the W wiring is used. For a more complete explanation of the W wiring, see the section on "Release," below. The HS conductor is switched from ground (+) (formerly extended over contacts 343, **521*a*, the upper winding of toll relay 470 and rest contacts 216) to (−) battery applied through contacts 231, 215, 521*a* and 343**. This feature is important only when the call originates at a toll switchboard.

Conversation now takes place over the tip and ring conductors from the calling subscriber to the called subscriber, the talking path being shown by heavily inked lines near the top of Figs. 2–5. During conversation, maintenance personnel is given an "off-hook" supervision by monitor lamp MON which glows dimly since it is now energized by only the ground (+) potential extended through resistance R6 because contacts 612 and 721 are now open.

*Release*

When it comes to releasing the switch, arrangements are made for either last party release or calling party release, as may be required under various circumstances. For example, if last party release is to be provided, the W wiring, in Fig. 6, connects contacts 611 to supply an alternate master ground (+) in parallel with contacts 631; whereas, if calling party release is provided, the W wiring is omitted so that master ground (+) is applied completely under the influence of release delay relay 230.

Assuming first that the W wiring is connected in place and that the calling party disconnects first, the loop over which calling bridge relay 220 has been holding is opened at the calling station. Contacts 221 open so that release delay relay 230 drops. Contacts 232 open and ground (+) is removed from sleeve conductor S, thereby releasing preceding equipment. Contacts 631 open and 632 close transferring control over the application of master ground completely to contacts 611 which are responsive only to the called subscriber's action. A circuit is completed for reoperating secondary delay relay 720. This circuit may be traced from ground (+) applied on contacts 611, over the W wiring, contacts 632 and through the upper winding of secondary delay relay 720 to (−) battery. Contacts 321 close, thereby applying a busy ground (+) marking to the S conductor to prevent selection of the connector until the called party hangs up. Monitor lamp MON glows brightly via contacts 721 and 741 as an indication that the connector is still held from the called end.

The connector circuit now holds until the called party hangs up at which time the loop, including the windings of answer bridge relay 210, is broken. Contacts 211 and 214 are returned to their normal position by the release of answer bridge relay 210 thereby preparing for battery feed from calling bridge relay 220 in the normal direction on the next call. Contacts 215 and 216 return the HS conductor to a marking which is extended from ground (+). When answer bridge relay 210 restores, contacts 611 open thereby removing the master ground (+) from which secondary delay relay 720, ring-trip relay 490 and switchthrough relay 520 had been holding via the master ground conductor MG. These relays restore. When secondary delay relay 720 releases, monitor lamp MON goes out as an indication that the connector is released. When ring-trip relay 490 restores, ground (+) is returned at contacts 497 for preparing a marking to be applied to start conductor on the next call. When switchthrough relay 520 releases, an alternate ground (+) is applied to contacts 526 also preparing for the next call. A circuit is now completed from the release alarm conductor through contacts 234, 525a, minor switch off-normal contacts 533, to release magnet MR of the minor switch, which drops-back to normal restoring its off-normal contacts 530. A circuit is also completed for causing the connector switch to drop-back to normal, this circuit extends from the release alarm conductor over contacts 234, 525a, primary and secondary off-normal contacts 700 and 701 to (−) battery through the winding of magnet RM.

During the release of the switch, contacts 200 are closed to extend a ground (+) marking to sleeve conductor S thereby guarding against selection of this connector by a preceding selector switch until the circuit is returned to normal completely. When the switch is fully restored, off-normal contacts 500, 600, 601, 700 and 701 return to the position shown, thereby restoring release magnet RM. The circuit is ready for the next call.

The next function to be described is release of the connector when the called party is the first to hang-up. He restores his receiver thereby opening the loop across tip and ring conductors T′ and R′ thus releasing answer bridge relay 210. The answer bridge relay releases and opens the alternate master ground (+) circuit at contacts 611. At contacts 211—214, the talking circuit is broken and the tip and ring conductors are returned to the normal battery connections through calling bridge relay 220. The monitor lamp MON glows brightly from solid ground (+) applied at contacts 612.

Following release of relay 210, the circuit is held from master ground (+) at contacts 631 until the calling subscriber hangs-up at which time the loop to calling bridge relay 220 is broken. Monitor lamp MON goes-out when contacts 621 open. When release delay relay 230 restores responsive to the opening of contacts 221, contacts 232 open releasing the preceding equipment. Contacts 631 also open to remove master ground (+) causing switch-through relay 520 and ring-trip relay 490 to restore. When ring-trip relay 490 restores, contacts 497 close to reconnect ground (+) with the start lead. Switch-through relay 520 releases and applies another alternate ground to the start lead at contacts 526. A circuit is now completed from the release alarm conductor through contacts 234, 525a and 533 to minor switch release magnet MR, thus restoring it to normal and release its off-normal contacts 530. Also, a circuit is completed from the release alarm conductor through off-normal contacts 700 and 701 to release magnet RM, thus restoring the connector switch to normal. During restoration, release magnet interrupter contacts 200 close to apply a guarding ground (+) potential to sleeve conductor S, thereby preventing this circuit from being seized by a preceding circuit. When the connector switch is in a completely normal position, the primary and secondary off-normal contacts 500, 600, 601, 700 and 701 release thereby restoring the RM magnet which in turn opens contacts 200 so that the switch is ready for the next call.

*Trunk hunting*

The next call to be described involves trunk hunting. For example, the call may be from subscriber A to subscriber H (Fig. 1) in which case hunting is over P. B. X trunk group 108, the first of which is marked by ground (+) on the HS bank as at terminal 900 and the last of which is marked by resistor R10 which interconnects the S and HS banks. The markings are shown in Figs. 9, 10 and 11. It is assumed that on P. B. X calls the brushes (T′, R′, S′ and HS′) in the upper right corner of Fig. 5 engages a bank having terminals marked as shown in Fig. 9. Conductors S2 and HS2 may connect with either conductors S3 and HS3 or S4 and HS4, as required. In either case, a resistor (R10 or R11) marks the end of the P. B. X group. The chief difference is that Fig. 11 provides a peg count feature which records the number of times that all P. B. X trunks are searched without finding an idle terminal.

In greater detail, subscriber A places the call and it proceeds as described above, to the point where the busy test is made. When party delay relay 330 restores, following the complete transmission of the third digit pulse train, its contacts 332 connect the winding of trunk hunt relay 460 to conductor HS′. This path is complete—during the slow release time interval of party hunt relay 740—as follows: (−) battery through the lower winding of relay 460, resting contacts 463, operated contacts 345, resting contacts 332, to conductor HS′. The purpose of relay 460 is to discriminate between calls and to detect those that require trunk hunting if the first trunk in the group is busy and to hold over pulsing of relay 450. Assuming that the connector has been directed to the first line in a P. B. X trunk group, the S′ and HS′ wipers encounter the marking shown in Fig. 9; therefore, ground (+) is extended from terminal 900 over conductor HS′ to operate trunk hunt relay 460. It closes a locking path for itself through its lower windings and its preliminary or "X" contacts 764 to master ground (+) applied at operated contacts 631. Contacts 465 close to prepare hunt assist relay 450. Contacts 462 open to prevent any possible intercept on trunk-hunt calls.

Assuming next that the first line in the P. B. X trunk group is busy, a circuit is completed for operating busy test relay 510 over a path which extends from the busy ground marking (not shown) applied to conductor S′, rest contacts 331, operated contacts 348, rest contacts 523a, to (−) battery through the upper winding of busy test relay 510. All of this has happened during the slow release time interval of party hunt relay 740; therefore, upon operation of busy test relay 510, a circuit is completed for locking relay 740 in an operated condition over the following circuit: (−) battery, relay 740, contacts 733, 346, 761, 811, 800 and conductor MG to ground (+) on contacts 631. Hunt assist relay 450 now operates over a path which may be extended from (−) battery through the lower winding of relay 450, operated contacts 346, 761, 811, secondary magnet interrupter contacts 800, to master ground (+) applied on operated contacts 631. The purpose of this relay is to asist the secondary magnet SM by insuring proper and complete steps of the switch in its secondary direction. Hunt assist relay 450 operates and closes a holding path for itself at its contacts 346, 751, secondary magnet interrupter contacts 800, conductor MG and contacts 631 to master ground (+). A circuit is completed for operating secondary magnet SM to drive the switch a step in its secondary direction. This circuit may be traced from (−) battery, through the winding of magnet SM, operated contacts 762, 752, and conductor MG, to master ground (+) applied on operated contacts 631. When magnet SM operates, the secondary interrupter contacts 800 open thus releasing hunt assist relay 450. Busy test relay 510 releases when the switch steps because brush S′ is moved out of contact with the terminal having the busy marking.

If the next and following lines are busy, this same cycle is repeated on each succeding terminal in the P. B. X group until either an idle line is found or the end of the P. B. X trunk group is reached. On each step, the circuit to party hunt relay 740 is opened at contacts 800; however, this relay continues to be held due to its slow release characteristics.

If an idle line is found, the circuit operates as described above in the section entitled "Switchthrough," and following.

On the other hand, if an idle line is not found, trunk hunting continues until terminals 901 and 902 are reached. At this point there is a resistor (either R10 or R11) which connects sleeve conductor S′ with hunt sleeve conductor HS′, in the manner shown by Figs. 10 and 11, as the case may be. Either of these two figures may be connected with conductors S2 and HS2 in Fig. 9. If the switch fails to find an idle line in the P. B. X group, the busying ground applied to terminal 902 is extended through resistor R10 or R11, as the case may be, to conductor HS' and terminal 901. If Fig. 11 is used, relay 1110 operates contacts 1111 to register an all trunks busy condition in any suitable peg count device 1100. Hunt assist relay 450 locks operated to the busy ground by way of (—) battery, its upper windings, operated contacts 451, 465, 345, rest contacts 332, conductor HS', terminal 901, resistor R10 or R11, as the case may be, contacts 902 to the busy ground marking (not shown). With relay 450 locked in its operated position, magnet SM does not release; hence, the switch does not take any further steps in its secondary direction. Contacts 800 are held open for a period of time which is longer than the slow release time interval of party hunt relay 740; therefore, it releases. Responsive thereto, contacts 345 open to release hunt assist relay 450, which in turn releases magnet SM.

Busy test relay 510 locks in an operated position from (—) battery, through its upper winding, contacts 523*a*, 347, and 518, to ground (+) applied at contacts 233. Busy tone is extended from the busy tone conductor over contacts 514, 341, 522 and the upper winding of answer bridge relay 210, to the tip side T of the calling line. A 60 IPM flash is also connected through the lower winding of toll assist relay 780, contacts 516, 529 and 343, to return a busy flash supervision over the HS conductor; however, this flash has no purpose except when the call is from a toll board.

Upon receipt of the busy tone, the calling subscriber hangs up and the connector circuit is released in the manner described above in the section entitled "Release."

*Toll access*

The next call to be described is one from a toll board through the connector to a local subscriber. For example, the call could be from toll board 121, in Fig. 1, through trunk circuits 122 and 123, incoming selector 124, and connector 105, to a called subscriber, such as C. This connector is operated in a fashion similar to that described above either on the call to a private subscriber or on the call to a P. B. X group, except that certain functions are performed which are necessary to toll calls. These functions are as follows: (1) The operator is furnished with means for selectively controlling the time of the application of ringing current, (2) supervision is returned over conductor HS, and (3) means is provided for resignaling either a called subscriber, such as C, for example, or a called operator, such as 111, for example. These functions involve the operations of tool relays 470 and 780.

In greater detail, the operator at toll board 121 completes a connection to connector 105. It is seized in a manner described above in the section entitled "Seizure" and operates as described in the following sections. While the operator dials the proper digits to set connector 105 to seize the called line, the HS conductor which is normally connected to resistance ground, is transferred to resistance battery by means of any suitable equipment (not shown) at toll board 121. For example, if the toll operator is using a conventional telephone dial, this transfer may occur under the influence of off-normal dial springs. A circuit is now completed for operating relay 470 as follows: from the resistance battery on the off-normal dial springs (not shown) over conductor HS, contacts 343, 529, 515 and the upper winding of toll relay 470, to ground (+) on contacts 216. The purpose of this relay is to discriminate between calls and to detect toll calls as well as to initiate the functions necessary to toll calls.

Responsive to operation of relay 470, contacts 773 close to operate toll assist relay 780. Since party delay relay 330 is then operated, toll assist relay 780 operates over the path from (—) battery, the upper winding of relay 780, operated contacts 773, 734, resting minor switch off-normal contacts 531, master ground conductor MG, to master ground (+) applied at operated contacts 631. Toll assist relay 780 operates and locks to master ground (+) by way of its contacts 782 and conductor MG. Also, responsive to the operation of relay 470, a circuit is completed for operating ring-trip relay 490. This circuit may be traced from (—) battery, through the lower winding of relay 490, operated contacts 771, operated contacts 731, master ground conductor MG and master ground (+) applied at contacts 631. Operation of this relay prevents transmission of ringing current, except under control of the toll board operator. Party delay relay 330 is now locked in an operated conditions under the joint influence of relays 470 and 780 over the circuit which may be traced from (—) battery, through the upper winding of relay 330, operated contacts 734, 773, 782 and master ground conductor MG, to master ground (+) on contacts 631. Aside from this operation, the connector responds to digit pulses in exactly the same manner as was described above in connection with the call from subscriber A to subscriber C except that at the end of the third digit, party delay relay 330 does not release in the manner described above.

When the dial or key sender at toll board 121 returns to normal after the last digit pulse, the HS conductor is transferred from resistance battery back to normally applied resistance ground. Toll relay 470 restores and, at contacts 773, opens the circuit over which party delay relay 330 had been holding. This circuit included contacts 734, 773, 782 and 631. An alternate holding circuit for the lower winding of ring-trip relay 490 is closed at contacts 772. This circuit includes contacts 772, 892 and 631.

The connector switch tests for the busy line or trunk hunts, as the call may require, in the manner described above in the sections entitled "Busy line" and "Trunk hunting." After connection to an idle line, switchthrough relay 520 operates in the manner described above in the section entitled "Switchthrough."

*Holding*

A toll operator is now holding the called line; however, the called subscriber is not rung because ring-trip relay 490 is locked in an operated position. If a subscriber on the line which is being held attempts to place a call, a circuit is completed for operating the answer bridge relay 210. Responsive thereto, contacts 216 open and 215 close. Toll relay 470 is differentially energized. As was pointed out previously, when the toll operator's dial returned to normal the last time, hunt sleeve conductor HS was connected with resistance ground; hence, a circuit is now completed from (—) battery, through operated contacts 231, 215 and the upper and lower windings of toll relay 470. The lower winding goes directly to ground, and the upper winding goes to ground by way of operated contacts 521*a*, rest contacts 343 and hunt sleeve conductor HS. This differential energization of the windings of relay 470 prevents it from operating. Furthermore, extension of the (—) battery marking over hunt sleeve conductor HS gives the calling operator answer supervision. She converses with the subscriber attempting to call over the held line and informs him that a call may not be initiated at that time. He responds by replacing his receiver at which time answer bridge relay 210 releases and contact 216 recloses to give on-hook supervision to the toll operator, this supervision being the extension of ground (+) through the resistance of the upper winding of toll relay 470.

*Controlled ringing*

Thus, it is seen that the operator has seized, held and marked the called line busy without the extension of ringing current. To extend ringing current to the called line, the operator performs a suitable function which connects (—) battery to hunt sleeve conductor HS. Toll relay 470 reoperates, the circuit being from (—) battery on conductor HS, rest contacts 343, 529, 515, the upper winding of toll relay 470, to ground (+) on contacts 216. Toll relay 470 reoperates and opens contacts 772 while closing contacts 771. This causes ring-trip relay 490 to release. It might be well to recall that party delay relay 330 released when toll relay 470 released after its first operation; hence, contacts 731 are now open so that the ring-trip relay may not be held over this path at this time. Furthermore, it might be well to note that relay 780 is locked-operated, also responsive to the first operation of toll relay 470 so that contacts 781 are opened. Therefore, the ring-trip relay 490 releases and ringing current is transmitted to the called subscriber in the manner described above in the section entitled "Ringing." The operator restores her ringing key and toll relay 470 releases, while the connector circuit continues to signal the called party.

When the called party answers, answer bridge relay 210 operates and the circuit functions in the manner described above in the section entitled "Answer."

*Resignaling*

When the called party answers, ring-trip relay 490 operates and locks over contacts 772 and 892 to master ground. Therefore, if the calling operator wishes to resignal, a ring key is actuated at toll board 121 to forward resistance battery over the HS conductor and operate toll relay 470 once again. The circuit to ring-trip relay 490 is opened at contacts 772 so that it releases. This forwards ringing current to the called end in the manner described above in the section entitled "Controlled ringing."

*Call from subscriber A to subscriber K*

The next call to be described will be one through the twenty party connector switch **105*a*. This connector is the same as that described above except that this time the generator switching circuit of Fig. 12 and the A strap (left side of Fig. 8) are omitted while code switching relay 240 and strap B are provided. To make this substitution, it is necessary to connect the start conductor of Fig. 5 with start 2 conductor of Fig. 12; the hold ground strap B of Fig. 8 with the hold ground conductor of Fig. 12; pick-up 1 and pick-up 2 conductors of Fig. 6 with the same conductors of the interrupter and the coded ringing current conductors with terminals in bank 535 excluding contacts 1223 to 1221*c* and 1231 to 1231*a***. The code switching relay is connected as shown in the upper left corner of Fig. 2.

The purpose of describing this call is to illustrate how the twenty party code pulse of ringing current is used.

The call is initiated as in the case of a call through connector 105. It will be noted from Fig. 1 that selector 104 may seize twenty party connector **105*a* over either of two points of access. For example, if selector 104 is directed to its seventh level, twenty party connector 105*a* is seized over a path which includes code selecting relay 240 while if connector 105*a*** is seized over the ninth level access is direct and without the intervention of such a code selecting relay.

Figure 2:
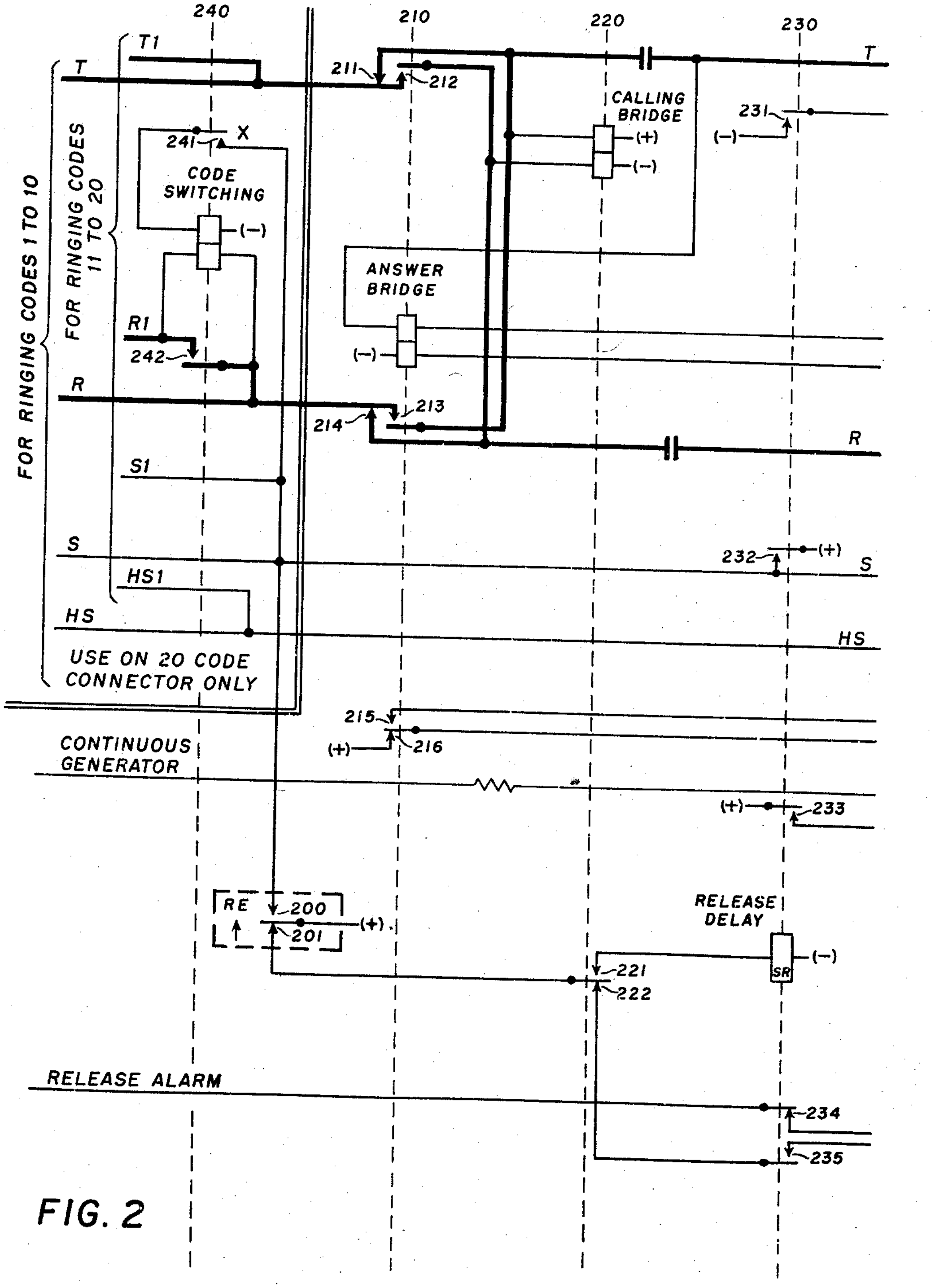
Figs. 2–8 show the details of the connectors shown in Fig. 1 by hollow boxes 105 and 105*a*.
Figure 3:
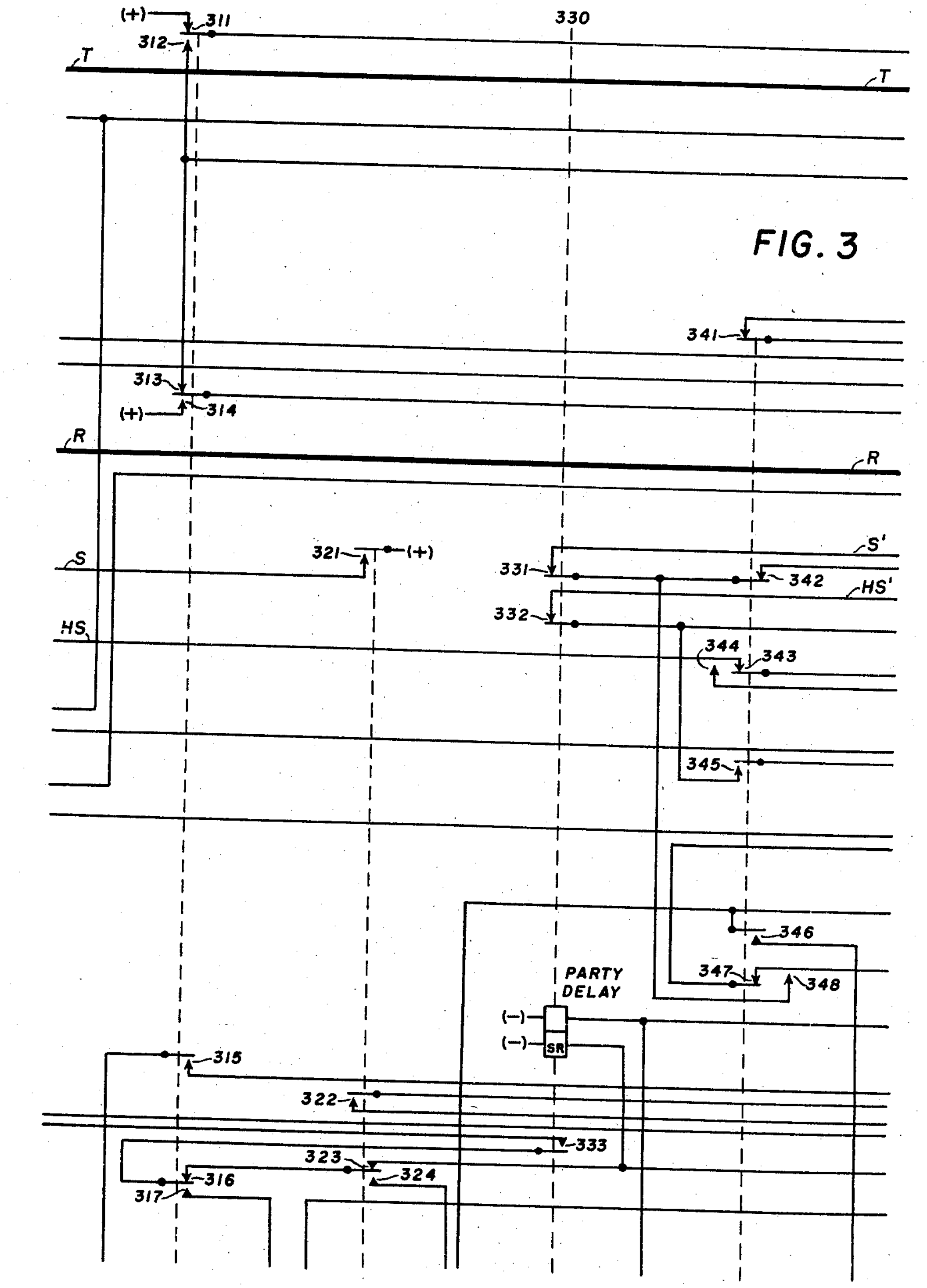
Figure 4:
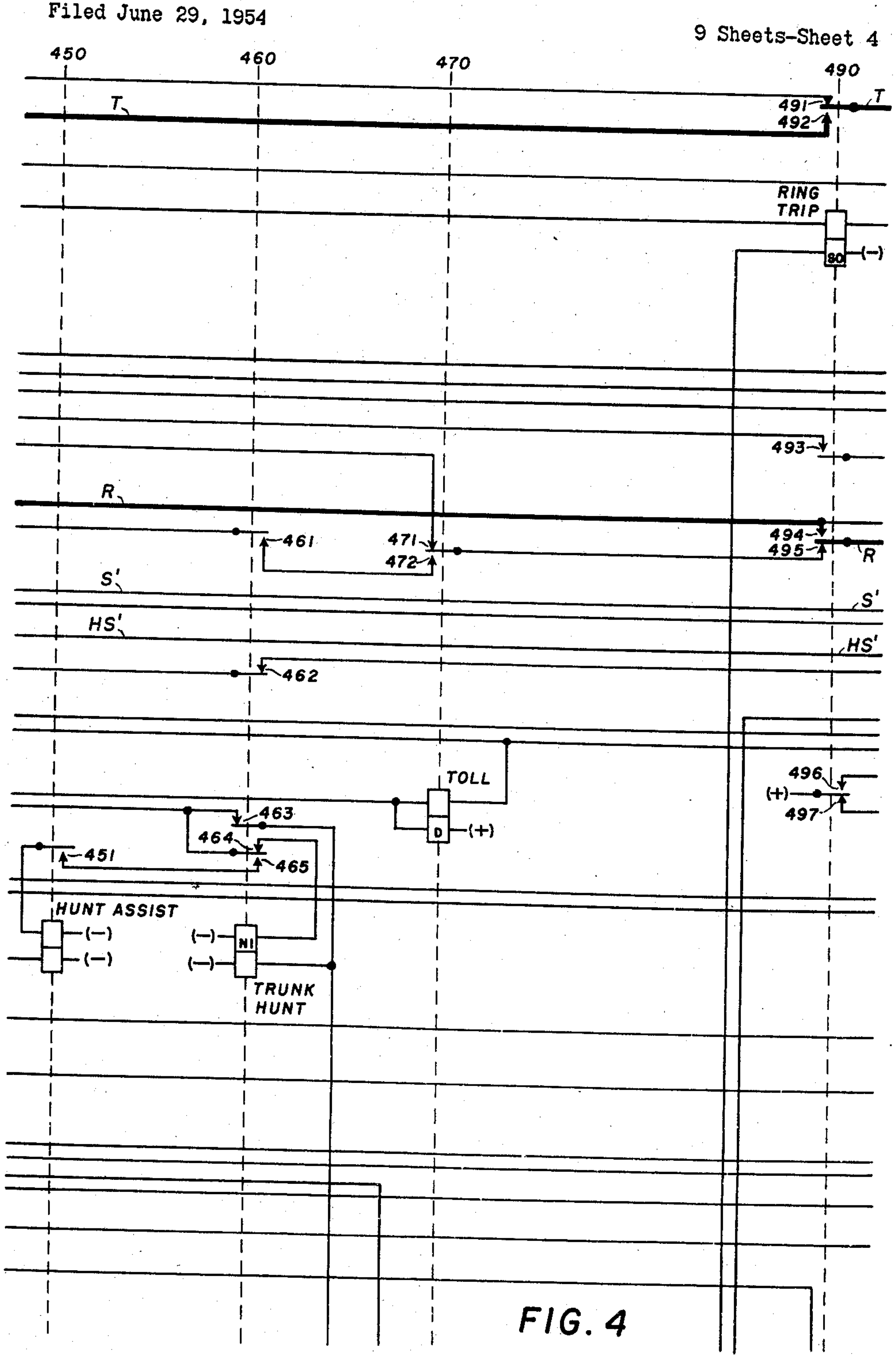
Figure 5:
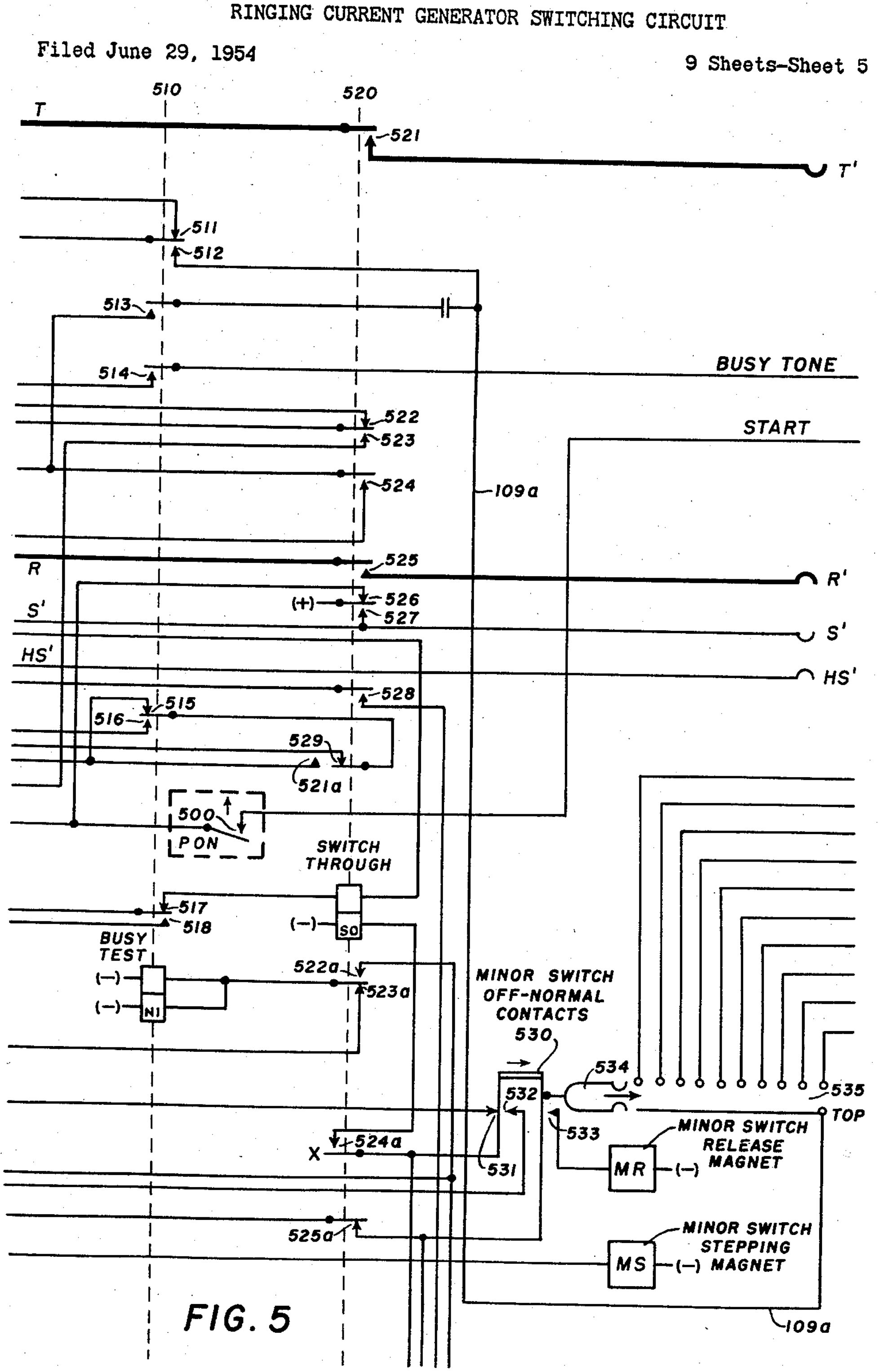

Referring next to Fig. 2, upper left corner, it is seen that access is from either a set of conductors marked "For ringing codes 1 to 10" or from a set of conductors marked "For ringing codes 11 to 20." In the first case, the call is exactly like one through a ten party connector as described above except for the function of strap B. When ringing current is to be applied, a pick-up pulse 1 is applied over contacts 244, 774, 822, 894, 813, minor switch bank 833 and contacts **522*a* to operate busy test relay 510. Since this relay initiates the application of ringing current to the called line and, further, since pick-up pulse 1 is after the twenty party code pulse it is seen that only ten party code pulses are transmitted. Busy test relay 510 holds operated during ringing by way of hold ground applied at strap "B", contacts 894*a*, 812, bank 833, and contacts 522*a* to (−) battery via the upper winding of busy test relay 510. When the hold ground is removed momentarily, relay 510 releases until it is reoperated by the next pick-up pulse. Since the hold ground release is before and the pick-up pulse 1 is after the twenty party code pulse, it is seen that the action of relay 510** causes only the ten party code ringing currents to be transmitted when access is by way of conductors T, R, S and HS.

On the other hand, if access is by way of the seventh level of selector 104 (Fig. 1), or stated otherwise, conductors T1, R1, S1 and HS1 (Fig. 2), code switching relay 240 operates in series with ring conductor R1. It closes its preliminary or "X" contacts 241 thereby locking to sleeve conductor S1. Contacts 242 close to shunt the lower winding of relay 240 thereby connecting ring conductor R1 directly to calling bridge relay 220. Contacts 243 (Fig. 6) close and 244 open; hence, busy test relay 510 is operated by pick-up pulse 2. This means that the twenty party code pulse is transmitted so that parties 11 to 20 are signaled.

*Miscellaneous*

For completeness of disclosure, many features have been shown which are not pertinent to an understanding of the invention. It is thought that these features need not be described in detail; however, it might be well to explain briefly what they are. Two resistor-capacitor networks marked SP are provided for spark protection of pulsing contacts. Slow release relays are marked with an SR, slow operate relays with an SO and differential relays with a D. An NI on a relay is used to indicate a non-inductive winding used to provide a resistance but which is incapable of operating the relay.

While I have shown a single embodiment of my invention, I intend to include, within the scope of the attached claims, all modifications that are within the true spirit of my invention.

What is claimed is:

1. In a telephone system, a source of ringing current comprising an interrupter for cyclically producing ten codes and a prefix pulse of ringing current, generator switching means operative to switch between two predetermined conditions, said last named means blocking said ringing current when in one of said conditions and said last named means transmitting said ringing current when in the other of said conditions, circuit means for interconnecting said interrupter and said generator switching means, and means for selectively switching said generator switching means to said one condition during said prefix pulse.

2. The telephone system of claim 1 and means in said interrupter for producing cyclically recurring pick-up pulses and hold pulses, one series of said pick-up pulses occurring after said prefix pulse, each of said hold pulses being interrupted momentarily at the start of each of said cycles and continuously effective throughout the remainder of each of said cycles, said generator switching means being selectively switched to said other predetermined condition by said one pick-up pulse series after said prefix pulse and being held in said other condition by said hold pulse until the start of the next of said cycles, whereby said prefix pulse is blocked by said generator switching means.

3. The telephone system of claim 1 and means in said interrupter for producing a series of cyclically recurring pick-up pulses each occurring before each of said prefix pulses and cyclically recurring hold pulses, each of said hold pulses being interrupted momentarily at the start of each of said cycles and continuously effective throughout the remainder of each of said cycles, said generator switching means being selectively switched to said other condition by said pick-up pulse and being held in said other condition by said hold pulse until just before said pick-up pulse, whereby said prefix pulse is not blocked by said generator switching means.

4. The telephone system of claim 1 and means in said interrupter for producing cyclically recurring pick-up pulses and hold pulses, one series of said pick-up pulses being before said prefix pulse and another series of said pick-up pulses being after said prefix pulse, said hold pulses being interrupted momentarily at the start of each of said cycles and continuously effective throughout the remainder of said cycles, said ten codes of ringing current being produced by said interrupter after said other series of pick-up pulses and during said continuously effective portion of said hold pulse, and means for selectively operating said switching means to said other condition responsive to either of said pick-up pulses and operating said switching means to said one condition responsive to termination of said hold pulse whereby said prefix pulse may be either operatively included or eliminated by said switching means.

5. The telephone system of claim 4 wherein said switching means comprises at least one relay having a set of make and a set of break contacts, ten conductors, one for each code of ringing current, circuit means for connecting each of said conductors to a load circuit through a different contact in one of said sets, means for connecting a given potential to a load circuit through each contact in the other of said sets of contact, means for selectively actuating said relay from a pick-up pulse in either of said series of pick-up pulses, and means responsive to said actuation of said relay for locking it operated under the influence of said hold pulse.

6. In a private branch telephone exchange, an electromechanical switch train comprising a connector having access to a called party line, means in said connector to control the application of ringing current to said party line, a source of ringing current comprising an interrupter for cyclically producing ten codes and a prefix pulse of ringing current, generator switching means operative to switch between two predetermined conditions, said switching means blocking said ringing current when in one of said conditions and transmitting said ringing current when in the other of said conditions, circuit means for interconnecting said interrupter and said generator switching means, and means for selectively switching said generator switching means to said one condition during said prefix pulse.

7. The telephone system of claim 6 and means in said interrupter for producing cyclically recurring pick-up pulses and hold pulses, one series of said pick-up pulses occurring after said prefix pulse, each of said hold pulses being interrupted momentarily at the start of each of said cycles and continuously effective throughout the remainder of each of said cycles, said generator switching means being selectively switched to said other predetermined condition by said one pick-up pulse series after said prefix pulse and being held in said other condition by said hold pulse until the start of the next of said cycles, whereby said prefix pulse is operatively eliminated by said switching means.

8. The telephone system of claim 7 and means in said interrupter for producing a second series of cyclically recurring pick-up pulses each occurring before each of said prefix pulses and after each interruption of said cyclically recurring hold pulses, said generator switching means being selectively switched to said other condition by said second series pick-up pulse and being held in said other condition by said hold pulse until just before said prefix pulse, whereby said prefix pulse is operatively included by said switching means.

9. The telephone system of claim 6 and means in said interrupter for producing cyclically recurring pick-up pulses and hold pulses, one series of said pick-up pulses being before said prefix pulse and another series of said pick-up pulses being after said prefix pulse, said hold pulses being interrupted momentarily at the start of each of said cycles and continuously effective throughout the remainder of said cycles, said ten codes of ringing current being produced by said interrupter after said other series of pick-up pulses and during said continuously effective portion of said hold pulse, and means for selectively operating said switching means to said other condition responsive to either of said pick-up pulses and operating said switching means to said one condition responsive to termination of said hold pulse.

10. The telephone system of claim 9 wherein said switching means comprises at least one relay having a set of make and a set of break contacts, ten conductors, one for each code of ringing current, circuit means for connecting each of said conductors to a load circuit through a different contact in one of said sets, means for connecting a given potential to a load circuit through each contact in the other of said sets of contact, means for selectively actuating said relay from a pick-up pulse in either of said series of pick-up pulses, and means responsive to said actuation of said relay for locking it operated under the influence of said hold pulse.

11. In a telephone system, first current control means for providing ten partly coded ringing currents, second current control means for providing twenty party coded ringing currents, subscriber stations served on a party line basis, a connector for use with either of said current control means, an adapter for utilizing said twenty party coded ringing current on a ten party basis, first circuit means for conducting said ringing currents to said connector via said adapter means when said connector is used with said second current control means, and other circuit means for conducting said ringing currents directly to said connector when said connector is used with said first current control means.

12. The telephone system of claim 11, and second adapter means for utilizing said twenty party coded ring currents of said second current control means on a twenty party basis, an automatic switch train, and second circuit means for connecting said automatic switch train to the input of said connector via said second adapter means.

13. The telephone system of claim 12, and means comprising two talking conductors and at least one control conductor for extending calls from a toll switchboard to said connector, means in said connector for selectively controlling the time of the application of ringing current, means for returning supervision over said control conductor and means for resignaling a called subscriber.

14. In a telephone system, a source of ringing current comprising an interrupter for cyclically producing a plurality of codes and a prefix pulse of ringing current, generator switching means operative to switch between two predetermined conditions, said last named means blocking said ringing current when in one of said conditions and said last named means transmitting said ringing current when in the other of said conditions, circuit means for interconnecting said interrupter and said generator switching means, and means for selectively switching said generator switching means to said one condition during said prefix pulse.

15. The telephone system of claim 14 and means in said interrupter for producing cyclically recurring pick-up pulses and hold pulses, one series of said pick-up pulses occurring after said prefix pulse, each of said hold pulses being interrupted momentarily at the start of each of said cycles and continuously effective throughout the remainder of each of said cycles, said generator switching means being selectively switched to said other predetermined condition by said one pick-up pulse series after said prefix pulse and being held in said other condition by said hold pulse until the start of the next of said cycles, whereby said prefix pulse is blocked by said generator switching means.

16. In a telephone system, first current control means for providing a first number of coded ringing currents, second current control means for providing a second number of coded ringing currents, subscriber stations served on a party line basis, a connector for use with either of said current control means, an adapter for utilizing said second number of coded ringing currents on the basis of said first number, first circuit means for conducting said ringing currents to said connector via said adapter means when said connector is used with said second current control means, and other circuit means for conducting said ringing currents directly to said connector when said connector is used with said first current control means.

17. The telephone system of claim 16 and second adapter means for utilizing said second number of coded ringing currents of said second current control means on the basis of said second number, an automatic switch train, and second circuit means for connecting said automatic switch train to the input of said connector via said second adapter means.

No references cited.

UNITED STATES PATENT OFFICE
CERTIFICATE OF CORRECTION

Patent No. 2,851,533 September 9, 1958

William W. Pharis

It is hereby certified that error appears in the printed specification of the above numbered patent requiring correction and that the said Letters Patent should read as corrected below.

Column 1, line 73, for "aaccompanying" read -- accompanying --; column 5, line 33, for "Partly" read -- Party --; column 8, line 6, for "batery" read -- battery --; column 14, line 42, for "asist" read -- assist --; column 15, line 49, for "tool" read -- toll --; column 16, line 12, for "conditions" read -- condition --; column 20, line 23, for "partly" read -- party --.

Signed and sealed this 12th day of May 1959.

(SEAL)
Attest:

KARL H. AXLINE
Attesting Officer

ROBERT C. WATSON
Commissioner of Patents